US008171513B2

(12) United States Patent
Lee

(10) Patent No.: US 8,171,513 B2
(45) Date of Patent: May 1, 2012

(54) ELECTRONIC PROGRAM GUIDE INFORMATION DISPLAY METHOD AND APPARATUS, AND BROADCASTING RECEIVER THEREOF

(75) Inventor: Jung-won Lee, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 546 days.

(21) Appl. No.: 11/482,691

(22) Filed: Jul. 10, 2006

(65) Prior Publication Data

US 2007/0039021 A1    Feb. 15, 2007

(30) Foreign Application Priority Data

Aug. 9, 2005  (KR) .................. 10-2005-0072975

(51) Int. Cl.
*G06F 3/00*      (2006.01)
*G06F 3/048*     (2006.01)
(52) U.S. Cl. .......................... 725/39; 715/788
(58) Field of Classification Search .............. 725/39, 725/37, 40, 44, 47, 50, 136, 52, 38; 715/212, 715/217, 219–221, 224, 225, 254, 200–202, 715/211, 234, 238, 243–246, 788, 798, 800; 345/55
See application file for complete search history.

(56) References Cited

U.S. PATENT DOCUMENTS

| | | | | | |
|---|---|---|---|---|---|
| 5,559,548 | A | * | 9/1996 | Davis et al. ...................... | 725/40 |
| 5,635,978 | A | * | 6/1997 | Alten et al. ...................... | 725/42 |
| 6,421,067 | B1 | * | 7/2002 | Kamen et al. .................. | 715/719 |
| 6,857,128 | B1 | * | 2/2005 | Borden et al. ................... | 725/39 |
| 7,139,031 | B1 | * | 11/2006 | Bray ............................. | 348/468 |
| 2002/0047849 | A1 | | 4/2002 | Kamen | |
| 2002/0087985 | A1 | * | 7/2002 | Kamen et al. .................... | 725/39 |
| 2003/0159107 | A1 | * | 8/2003 | Bederson et al. ............. | 715/500 |
| 2003/0159144 | A1 | * | 8/2003 | Kitagawa et al. ............... | 725/44 |

FOREIGN PATENT DOCUMENTS

| | | | |
|---|---|---|---|
| JP | 10028244 A | * | 1/1998 |
| KR | 10-1999-0067564 A | | 8/1999 |
| KR | 10-2001-0042544 A | | 5/2001 |
| KR | 10-2002-0067063 A | | 8/2002 |
| KR | 10-2004-0031060 A | | 4/2004 |
| WO | 97/18670 A1 | | 5/1997 |

* cited by examiner

*Primary Examiner* — Hai V Tran
*Assistant Examiner* — Jason Thomas
(74) *Attorney, Agent, or Firm* — Sughrue Mion, PLLC

(57) ABSTRACT

Provided are a method and apparatus for displaying electronic program guide (EPG) information so that a broadcast program can be searched for even when the size of each display region of an EPG information screen, which displays program information, is small or reduced and a broadcast receiver therefor. The method includes detecting program information for each of a plurality of broadcast programs which are to be displayed from the electronic program guide information, adjusting or changing the program information to be suitable for a display region for each broadcast program in an electronic program guide information screen, and constructing and displaying the electronic program guide information screen so that the electronic program guide information reflects the adjusted or changed program information.

26 Claims, 12 Drawing Sheets

FIG. 1 (PRIOR ART)

| | WEDNESDAY, 18 MAY 2005 | | | |
|---|---|---|---|---|
| | 9:00 | 9:30 | 10:00 | 10:30 |
| CH1 | TODAY'S SPORTS | | MAIN MOVIE | |
| CH2 | NEW SITCOM | INTENSIVE DISCUSSION | | CLOSING |
| CH3 | PRO | 9 O'CLOCK NEWS | SPORTS NEWS | MOVIE THEATER |
| CH4 | EURO SOCCER | | OUR LIVING STORIES | NEWS TONIGHT |
| CH5 | INVITATION LECTURE | SPECIAL DOCUMENTARY | TV THEATER | |

CHANNEL AXIS ↑

TIME AXIS →

FIG. 2 (PRIOR ART)

| | WEDNESDAY, 18 MAY 2005 | | | | | | | |
|---|---|---|---|---|---|---|---|---|
| | 9:00 | 9:30 | 10:00 | 10:30 | 11:00 | 11:30 | 12:00 | 12:30 |
| CH1 | TODAY | MAIN MOVIE | | | WORLD MOVIE | | | |
| CH2 | NEW | INTENSIVE DISCUSSION | | CLOSING NEWS | | | MIDNIGHT FA | |
| CH3 | | 9 O'CLOCK | | SPORTS | MOVIE THEATER | | | |
| CH4 | EURO SO | | OUR LIV | NEWS TONIGHT | | NEWS 24 | | MIDNIG |
| CH5 | INVITA | SPECIAL | | TV THEATER | | | SPECIAL PROGRA | |

201, 202, 203 — CHANNEL AXIS ↑

205, 207, 208, 206, 204 — TIME AXIS →

| | WEDNESDAY, 18 MAY 2005 | | | | | | | |
|---|---|---|---|---|---|---|---|---|
| | 9:00 | 9:30 | 10:00 | 10:30 | 11:00 | 11:30 | 12:00 | 12:30 |
| CH1 | TODAY'S NEWS | | MAIN MOVIE | | | | WORLD MOVIE | |
| CH2 | NEW SITCOM | INTENSIVE DISCUSSION | | | CLOSING NEWS | | MIDNIGHT FACTION | |
| CH3 | PRO | 9 O'CLOCK NEWS | | SPORTS NEWS | MOVIE THEATER | | | |
| CH4 | EURO SOCCER | | OUR LIVING STORIES | | NEWS TONIGHT | | NEWS 24 | MIDNIGHT FACTION |

CHANNEL AXIS ↑

→ TIME AXIS

ELECTRONIC PROGRAM GUIDE INFORMATION DISPLAY METHOD AND APPARATUS, AND BROADCASTING RECEIVER THEREOF

CROSS-REFERENCE TO RELATED PATENT APPLICATIONS

This application claims the priority of Korean Patent Application No. 10-2005-0072975, filed on Aug. 9, 2005, in the Korean Intellectual Property Office, the disclosure of which is incorporated herein in its entirety by reference.

BACKGROUND OF THE INVENTION

1. Field of the Invention

The present invention relates to a method and apparatus for displaying electronic program guide (hereinafter referred to as "EPG") information and a broadcasting receiver thereof, and more particularly, to an EPG information display method and apparatus for simplifying the search for a broadcast program and a broadcasting receiver thereof.

2. Description of the Related Art

EPG information is announcement information for broadcast programs that can be received by a broadcasting receiver. Thus, a user can search for a desired broadcast program on an EPG information screen displayed on a display unit of the broadcasting receiver. FIG. 1 is a view illustrating a conventional EPG information screen. Referring to FIG. 1, EPG information is categorized according to channel and time, and program titles are displayed as program information. However, since the size of the screen to be displayed is fixed, the user must move the EPG information screen upward, downward, or to the right/left in order to search for EPG information other than the EPG information currently displayed on the screen.

To increase the range of detecting EPG information displayed on an EPG information screen, a method of adjusting the time axis of the EPG information screen as illustrated in FIG. 2 has been proposed. FIG. 2 is a view illustrating the EPG information screen, illustrated in FIG. 1, which is adjusted by reducing the time axis. When the time axis of the EPG information screen is reduced as illustrated in FIG. 2, the search range of available broadcast programs displayed on the EPG information screen according to time is greater than on the EPG information screen illustrated in FIG. 1.

However, when the time axis of the EPG information screen is reduced while fixing the channel axis thereof as illustrated in FIG. 2, the sizes of regions, e.g., display regions 201 through 208 of FIG. 2, of the screen that respectively display program titles are reduced, and thus, the program titles may not be completely displayed. For instance, in the case of the display region 201, the program title "Today's Sports" is completely displayed in FIG. 1 but only "Today" of the program title "Today's Sports" is displayed due to a reduction in the display regions in FIG. 2. If program titles are not completely displayed, it is difficult to search a displayed EPG information screen for broadcast programs.

To solve this problem, the channel axis of an EPG information screen can be increased while reducing the time axis thereof, as illustrated in FIG. 3. FIG. 3 is a view illustrating the EPG information screen of FIG. 1, which is adjusted by reducing the time axis of the screen and increasing the channel axis thereof. However, since the size of an EPG information screen that displays EPG information is fixed as described above, an increase in the channel axis length of the screen may result in a reduction in a total number of channels that can be displayed on the screen as illustrated in FIG. 3. If a total number of channels that can be displayed is reduced, the search range of available broadcast programs according to time is increased, but the search range of available broadcast programs according to channel is reduced.

Accordingly, the ranges of adjusting the time axis and the channel axis of the EPG information screen are limited, thereby limiting the search range of available EPG information displayed in the EPG information screen.

SUMMARY OF THE INVENTION

The present invention provides an EPG information display method and apparatus for easy search for broadcast programs that can be received, and a broadcasting receiver thereof.

The present invention also provides an EPG information display method and apparatus for searching for a broadcast program even when display regions of an EPG information screen that displays program information are small or reduced, and a broadcasting receiver thereof.

The present invention also provides an EPG information display method and apparatus for increasing the search range of available broadcast programs displayed in an EPG information screen, and a broadcasting receiver thereof.

According to one aspect of the present invention, there is provided a method of displaying electronic program guide information, the method including detecting program information, for each of a plurality of broadcast programs, which is to be displayed, from the electronic program guide information; adjusting or changing the program information to be suitable for a display region for each broadcast program in an electronic program guide information screen; and constructing and displaying the electronic program guide information screen so that the electronic program guide information screen reflects the adjusted or changed program information.

According to another aspect of the present invention, there is provided a method of displaying electronic program guide information, the method including detecting program information for each of a plurality of broadcast programs which is to be displayed from the electronic program guide information; categorizing the detected program information into program information which is allowed to be displayed in display regions of an electronic program guide information screen and program information which is not allowed to be displayed in the display regions; when the program information which is not allowed to be displayed is present, adjusting or changing the program information; updating the program information to be displayed, based on the adjusted or changed program information and constructing and displaying the electronic program guide information screen, based on the program information to be displayed and screen constituent information of the electronic program guide information.

According to another aspect of the present invention, there is provided a method of displaying electronic program guide information, the method including (a) collecting the electronic program guide information for each of a plurality of broadcast programs from a broadcast signal; (b) detecting program information for each broadcast program which is to be displayed, using the collected electronic program guide information and screen constituent information of the electronic program guide information; (c) categorizing the program information to be displayed into program information which is not allowed to be displayed in a display region for each broadcast program in an electronic program guide information screen, and program information which is allowed to be displayed in the display region; (d) when program information which is not allowed to be displayed in the display region is present, adjusting or changing the program information; (e) updating the program information to be displayed, based on the adjusted or changed program information; (f) repeatedly performing (c) through (e) until program information which is not allowed to be displayed is not included in the program information to be displayed; and (g) when program information which is not allowed to be displayed is not included in the program information to be displayed, constructing and displaying the electronic program guide information screen, based on the program information to be displayed and the screen constituent information.

According to another aspect of the present invention, there is provided an apparatus for displaying electronic program guide information, the apparatus including a guide information detector which detects the electronic program guide information from a received broadcast signal; a controller adjusting or changing program information, for each of a plurality of broadcast programs, to be suitable for a display region for each broadcast program in an electronic program guide information screen, and generating the electronic program guide information screen so that the electronic program guide information screen reflects the adjusted or changed program information, the electronic program guide information screen being determined using the detected electronic program guide information and screen constituent information of the electronic program guide information; and a display unit displaying the electronic program guide information screen generated by the controller.

According to another aspect of the present invention, there is provided an apparatus for displaying electronic program guide information, the apparatus including a program information detector which detects program information for each of a plurality of broadcast programs which is to be displayed from the electronic program guide information; a program information classification unit categorizing the program information to be displayed into program information which is allowed to be displayed in display regions to be set in an electronic program guide information screen and program information which is not allowed to be displayed in the display regions, based on information regarding the display regions; a program information adjusting or changing unit adjusting or changing the program information which is not allowed to be displayed in the display regions; a program information update unit updating the program information to be displayed, based on the adjusted or changed program information; a screen construction unit constructing the electronic program guide information screen, based on the program information to be displayed and screen constituent information of the program guide information; and a display unit displaying the electronic program guide information screen constructed by the screen construction unit.

According to another aspect of the present invention, there is provided an apparatus for displaying electronic program guide information, the apparatus including a program information detector which detects program information for each of a plurality of broadcast programs which is to be displayed, from the electronic program guide information; a program information classification unit categorizing the program information to be displayed into program information which is allowed to be displayed in display regions to be set in an electronic program guide information screen and program information which is not allowed to be displayed in the display regions, based on information regarding the display regions; a program information adjusting or changing unit adjusting or changing the program information which is not allowed to be displayed in the display regions; a program information update unit updating the program information to be displayed, based on the adjusted or changed program information, and transmitting the updated program information to the program information classification unit; a screen construction unit constructing the electronic program guide information screen when the program information classification unit informs the program information update unit that program information which is not allowed to be displayed is not present, based on the program information to be displayed and screen constituent information of the program guide information, the program information, which is to be displayed, being received from the program information update unit, and a display unit displaying the electronic program guide information screen constructed by the screen construction unit.

According to another aspect of the present invention, there is provided a broadcasting receiver for displaying electronic program guide information, the broadcasting receiver including a tuner receiving a broadcast signal; a decoder decoding the broadcast signal received from the tuner to obtain the electronic program guide information for each of a plurality of broadcast programs; a command input unit via which screen construction information required to construct the electronic program guide information screen is input; a controller adjusting or changing program information for each broadcast program according to a display region for each broadcast program in the electronic program guide information screen, using the electronic program guide information for each broadcast program and screen constituent information of the electronic program guide information; and generating the electronic program guide information screen so that the electronic program guide information reflects the adjusted or changed program information, wherein the program information is detected from the electronic program guide information; a storage unit storing the electronic program guide information for each broadcast program under control of the controller, and a display unit displaying the electronic program guide information screen generated by the controller.

BRIEF DESCRIPTION OF THE DRAWINGS

The above and other aspects and advantages of the present invention will become more apparent by describing in detail exemplary embodiments thereof with reference to the attached drawings in which:

FIG. 1 is a view illustrating a conventional EPG information screen;

FIG. 2 is a view illustrating the EPG information screen of FIG. 1, which is adjusted by reducing the time axis thereof;

DETAILED DESCRIPTION OF THE INVENTION

Hereinafter, exemplary embodiments of the present invention will be described in detail with reference to the accompanying drawings.

Figures 3, 4:
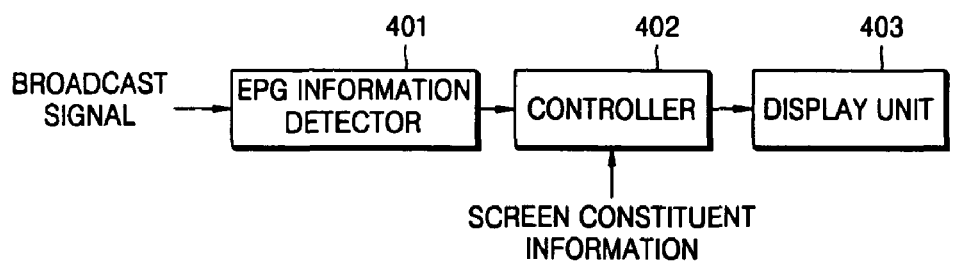
FIG. 3 is a view illustrating the EPG information screen of FIG. 1, which is adjusted by reducing the time axis of the screen and increasing the channel axis thereof.
FIG. 4 is a block diagram illustrating an apparatus for displaying EPG information according to an exemplary embodiment of the present invention.

FIG. 4 is a block diagram illustrating an apparatus for displaying EPG information according to an exemplary embodiment of the present invention. Referring to FIG. 4, the apparatus includes an EPG information detector 401, a controller 402, and a display unit 403.

The EPG information detector 401 detects EPG information from a received broadcast signal. The EPG information detector 401 may operate when a user requests EPG information be displayed, when the display units of the time axis or the channel axis of an EPG information screen that is currently displayed are adjusted, or when EPG information transmitted from a broadcasting station is changed.

The EPG information detector 401 detects the EPG information from a broadcast signal by decoding the broadcast signal in a manner in which packets are decoded. The detected EPG information may contain basic information (broadcast time information, channel information, program title, program genre, etc. of each broadcast program), or may further contain detailed information (the names of a leading actor and a director, etc.) that allows the user to understand the content of the broadcast program. The detected EPG information is transmitted to the controller 402.

The controller 402 determines display regions for respective broadcast programs, which are to be set in the EPG information screen, using the detected EPG information and the constituent information of the EPG information screen. The constituent information can include information for a total number of channels to be displayed on the EPG information screen, and information for time zones for which broadcast programs are categorized. The constituent information may be predetermined or set by the user.

Accordingly, if the number of channels and time zones which are to be displayed on the EPG information screen increases, the size of a display region for each broadcast program decreases. In contrast, if the number of channels and time zones to be displayed in the EPG information screen decreases, the size of a display region for each broadcast program increases.

Figure 5:
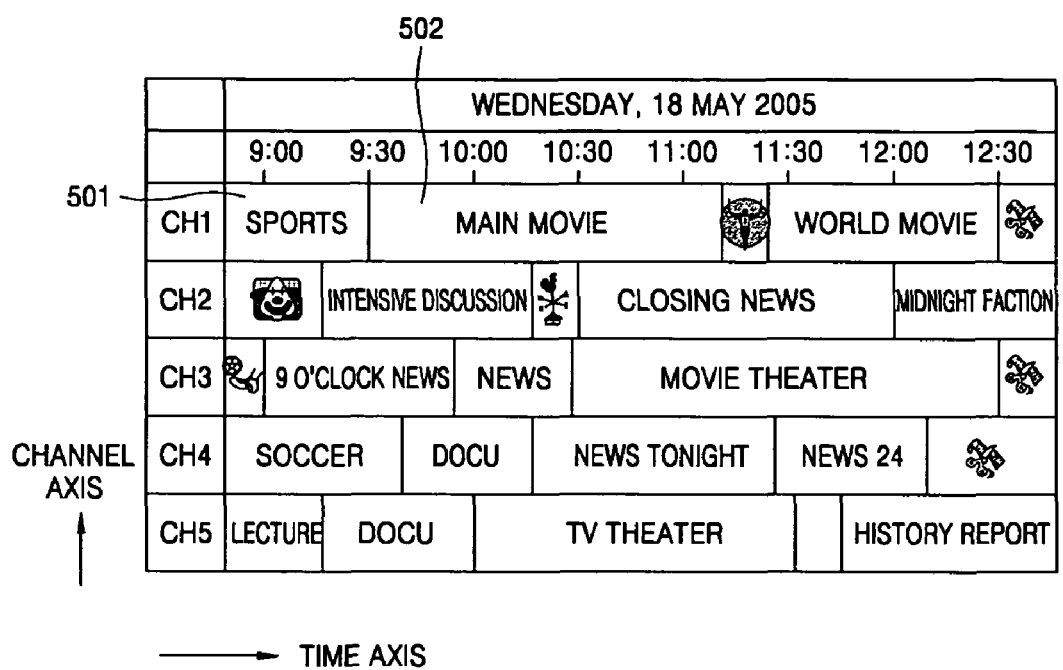
FIG. 5 is a view illustrating an EPG information screen displayed according to an exemplary embodiment of the present invention.

FIG. 5 is a view illustrating an EPG information screen displayed according to an exemplary embodiment of the present invention. Referring to FIG. 5, reference numeral 501 denotes a display region for a broadcast program "Sports" to be broadcast via a channel CHI from 8:50 to 9:30 am, and reference numeral 502 denotes a display region for a broadcast program "Masterpiece Movie" to be broadcast via the channel CHI from 9:30 am to 11:15 am.

The controller 402 detects program information that is categorized according to broadcast programs from the detected EPG information. For instance, when program titles are required as program information, the controller 402 detects the program title of each broadcast program, as the program information to be displayed, from the detected EPG information.

The controller 402 adjusts or changes the program information of each broadcast program according to the display regions determined by each broadcast program. That is, when program information cannot be displayed in a corresponding display region, the controller 402 adjusts or changes the program information. The controller 402 can determine whether the program information can be displayed in the corresponding display region, based on the maximum amount of information that can be displayed in the display region and the amount of the program information. The maximum amount of the information and the amount of the program information may be represented using font length.

The controller 402 may adjust or change object program information to be displayed by deleting a word included in a list of predetermined "to be deleted" words from the object program information, replacing the object program information with a corresponding word in a list of predetermined substitute words, or replacing the object program information with a corresponding icon in a group of predetermined icons. Otherwise, the object program information may be adjusted or changed by sequentially performing the above methods.

The "to be deleted" words may be words, such as "special" or "invitation", that do not prevent a user from understanding the content of a broadcast program, although they are deleted from the title of a broadcast program. The substitute words and the icons may be words and icons that represent the content of programs. That is, the substitute words may be words that represent program genres, e.g., "sports", "news", "documentary", and "lecture", or words that represent program content, e.g., "soccer", indicated by block letters in FIG. 5. Also, although not illustrated in FIG. 5, the substitute words may be the names of the leading actors. The icons may be marks or images that can substitute for the substitute word.

After adjusting or changing the program information, the controller 402 generates and outputs an EPG information screen that includes the adjusted or changed program information. However, when the program information detected from the EPG information need not be adjusted or changed, the controller 402 generates and outputs an EPG information screen using the detected program information.

The display unit 403 displays the EPG information screen generated by the controller 402. The EPG information screen may be displayed as illustrated in FIG. 5.

In FIG. 5, when program information cannot be displayed in a corresponding display region, the program information is adjusted or changed by using the list of the "to be deleted" words. When there is further program information that cannot be displayed in a corresponding display region, the program information is replaced with a substitute word (sports, news, documentary, lecture, etc.). Nevertheless, when program information that cannot be displayed in a corresponding display region exists, a substitute word of the program information is replaced with a related icon. The icon may be selected from among a group of icons based on the substitute word.

Figure 6:
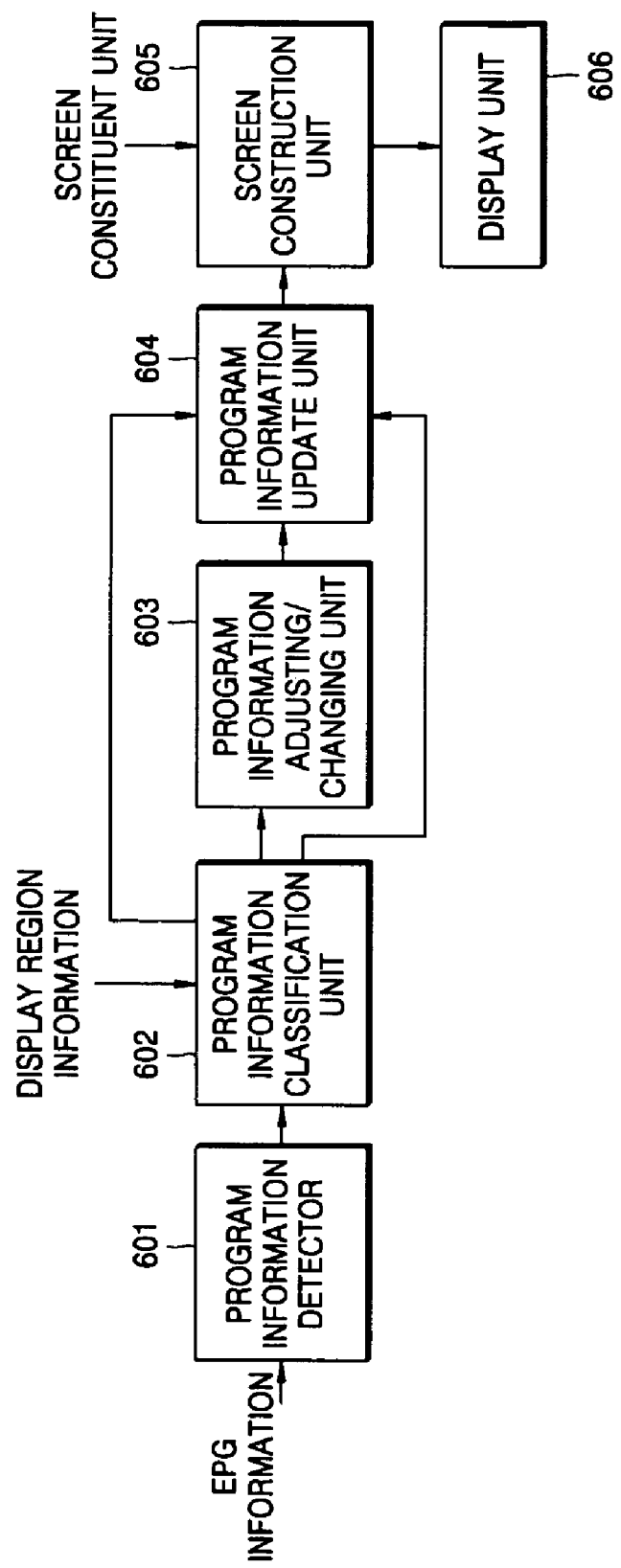
FIG. 6 is a block diagram illustrating an apparatus for displaying EPG information according to another exemplary embodiment of the present invention.

FIG. 6 is a block diagram illustrating an apparatus for displaying EPG information according to another exemplary embodiment of the present invention. Referring to FIG. 6, the apparatus includes a program information detector 601, a program information classification unit 602, a program information adjusting/changing unit 603, a program information update unit 604, a screen construction unit 605, and a display unit 606.

The program information detector 601 detects program information, which will be categorized according to broadcast programs, from received EPG information. The program information detector 601 may operate when a user requests the EPG information be displayed, when display units of the time axis or the channel axis of an EPG information screen that is currently displayed are adjusted, or when EPG information transmitted from a broadcasting station is changed. The received EPG information may be detected from a received broadcast signal or may have previously been stored in a storage unit (not shown).

The program information classification unit 602 classifies the program information into two types: program information that can be displayed in display regions of the EPG information screen and program information that cannot be displayed in the display regions of the EPG information screen, based on information regarding display regions to be set in the EPG information screen.

The display region information is generated based on screen constituent information described with reference to FIG. 4 and information regarding channels and time zones that are included in the EPG information, and indicates the size of the display region, for each broadcast program, of the EPG information screen. The display region information may be received from an additional generation block (not shown) or a controller (not shown).

The program information classification unit 602 compares the amount of object program information, for each broadcast program, which is transmitted from the program information detector 601, with the maximum amount of information that can be displayed in a corresponding display region. The amount of the object program information and the maximum amount of the information that can be displayed in a display region may be represented using font length.

If the amount of the object program information is greater than the maximum amount of information that can be displayed in a display region, the program information classification unit 602 determines that the object program information cannot be displayed in a corresponding display region. If the amount of the object program information is less than or equal to the maximum amount of information that can be displayed in a display region, the program information classification unit 602 determines that the object program information can be displayed in a corresponding display region. The program information that is determined not to be displayed in the corresponding display region is transmitted to the program information adjusting/changing unit 603, and the program information that is determined to be displayed in the corresponding display region is transmitted to the program information update unit 604.

However, if there is no program information that cannot be displayed in a corresponding display region, the program information classification unit 602 informs the program information update unit 604 of this fact.

The program information adjusting/changing unit 603 adjusts or changes program information that cannot be displayed in a corresponding display region. In this case, the program information adjusting/changing unit 603 may adjust or change the program information by deleting a word, which is listed in a list of predetermined "to be deleted" words, from the program information. The list of the "to be deleted" words has been described with reference to FIG. 4. The list of the "to be deleted" words is set in the program information adjusting/changing unit 603. The list of the "to be deleted" words may be determined by a user.

Otherwise, the program information adjusting/changing unit 603 may adjust or change the program information that cannot be displayed by replacing it with a substitute word or an icon. The substitute word and the icon have been described with reference to FIG. 4. A list of substitute words and/or a group of icons is set in the program information adjusting/changing unit 603. The list of the substitute words and the group of the icons may be determined by a user. The adjusted or changed program information is transmitted to the program information update unit 604.

The program information update unit 604 updates the object program information, based on the adjusted or changed program information. In other words, the program information update unit 604 updates the program information such that both the adjusted or changed program information and the program information received from the program information classification unit 602 are reflected in the EPG information screen. The program information output from the program information update unit 604 is transmitted to the screen construction unit 605.

Meanwhile, when the program information classification unit 602 informs the program information update unit 604 that there is no program information that cannot be displayed, the program information update unit 604 transmits the program information received from the program information classification unit 602 to the screen construction unit 605 without changing the received program information.

The screen construction unit 605 constructs the content of the EPG information screen, based on the program information received from the program information update unit 604 and the screen constituent information of the EPG information. The EPG constituent information has been described with reference to FIG. 4. Thus, the screen construction unit 605 may construct the EPG information screen as illustrated in FIG. 5. The information regarding the constructed EPG information screen is transmitted to the display unit 606.

The display unit 606 displays the EPG information screen, which is constructed by the screen construction unit 605, as illustrated in FIG. 5.

Figure 7:
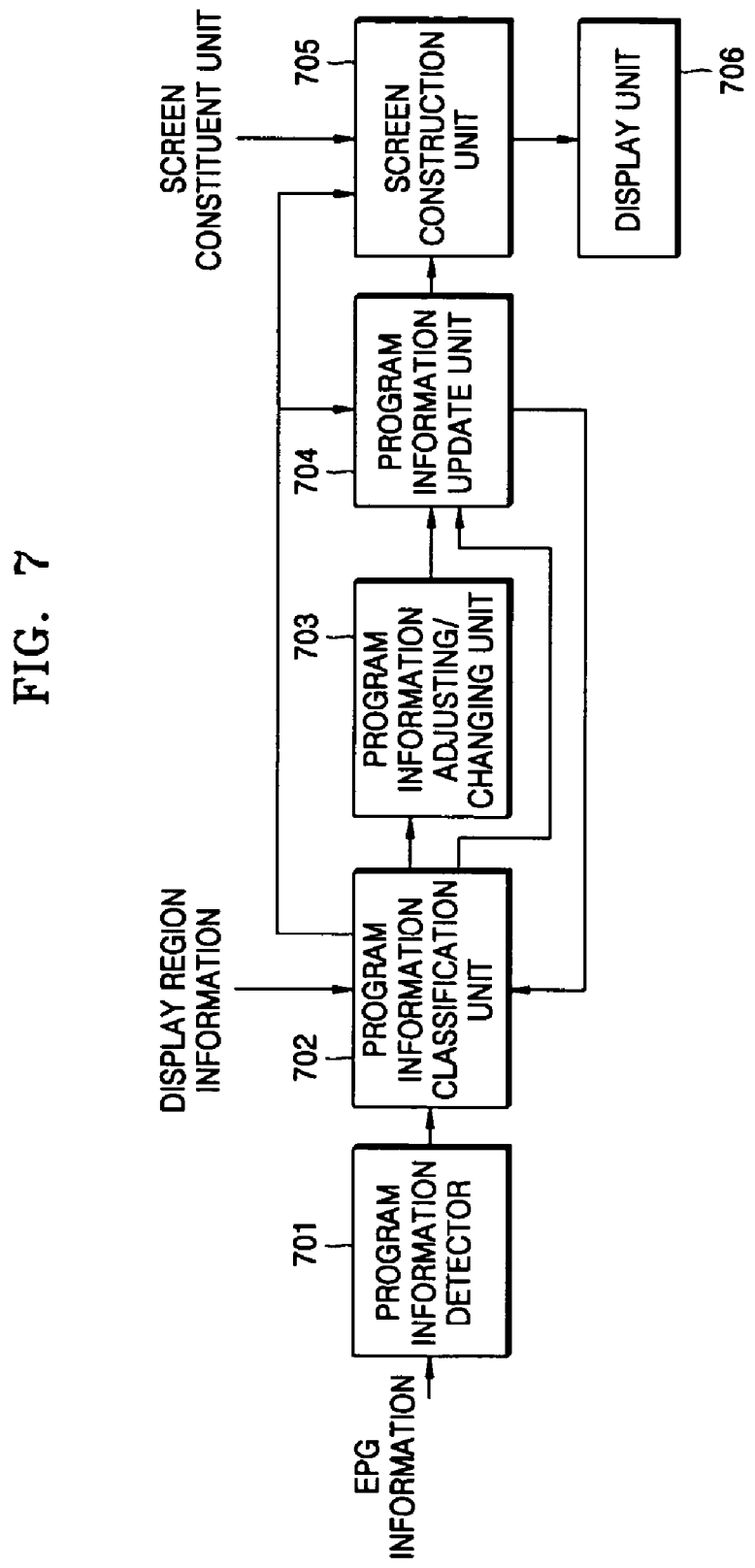
FIG. 7 is a block diagram illustrating an apparatus for displaying EPG information according to another exemplary embodiment of the present invention.

FIG. 7 is a block diagram illustrating an apparatus for displaying EPG information according to another exemplary embodiment of the present invention. Referring to FIG. 7, the apparatus includes a program information detector 701, program information classification unit 702, a program information adjusting/changing unit 703, a program information update unit 704, a screen construction unit 705, and a display unit 706.

The program information detector 701 detects program information, for each broadcast program, which is to be displayed from EPG information, similarly to the program information detector 601 of FIG. 6.

The program information classification unit 702 classifies the program information received from the program information detector 701 into program information that can be displayed in corresponding display regions and program information that cannot be displayed in corresponding display regions, similarly to the program information classification unit 602 of FIG. 6. Then, the program information classification unit 702 transmits the program information that cannot be displayed to the program information adjusting/changing unit 703, and transmits the program information that can be displayed to the program information update unit 704.

When the program information is updated by the program information update unit 704 and transmitted to the program information classification unit 702, the program information classification unit 702 classifies the updated program information into two types, similarly to the program information classification unit 602 of FIG. 6. In this case, when the program information is presented using an icon, even if a display region for the icon is considered as being insufficient to display the icon, the program information classification unit 702 determines that the program information can be displayed in the display region. Accordingly, if program information is represented with an icon, the icon may be displayed in a corresponding display region while extending over the borders of adjacent display regions.

The program information classification unit 702 repeatedly performs the above classification operation on the updated program information received from the program information update unit 704 until program information that cannot be displayed in a corresponding display region is not classified from the updated program information. If program information that cannot be displayed is not included in the updated program information, the program information classification unit 702 informs the program information update unit 704 and the screen construction unit 705 about this fact.

The program information adjusting/changing unit 703 receives the program information that cannot be displayed from the program information classification unit 702, and adjusts or changes the received program information. Specifically, upon receiving the program information from the program information classification unit 702, the program information adjusting/changing unit 703 checks a number of times that program information has been adjusted or changed.

If the program information has been adjusted or changed once, the program information adjusting/changing unit 703 adjusts or changes the program information by deleting a word listed in a list of predetermined "to be deleted" words, from the program information. The list of the "to be deleted" words has been described with reference to FIG. 4.

If the program information has been adjusted or changed twice, the program information adjusting/changing unit 703 adjusts or changes the program information by replacing it with a predetermined substitute word. The predetermined substitute word has been described with reference to FIG. 4.

If the program information has been adjusted or changed three times, the program information adjusting/changing unit 703 adjusts or changes the program information by replacing it with a predetermined icon. The predetermined icon has been described with reference to FIG. 4.

As described above, the program information adjusting/changing unit 703 may select a manner in which the program information is to be adjusted or changed, depending on the number of times that the program information has been adjusted or changed. However, the relationship between the manner in which the program information is to be adjusted or changed and the number of times that the program information has been adjusted or changed, can be changed.

The program information update unit 704 operates similarly to the program information update unit 604 of FIG. 6. However, as compared to the program information update unit 604, the program information update unit 704 further transmits the updated program information to be displayed to both the screen construction unit 705 and the program information classification unit 702. Furthermore, when the program information classification unit 702 informs the program information update unit 704 that there is no program information that cannot be displayed in a corresponding display region, the program information update unit 704 may transmit the program information to be displayed to the screen construction unit 705.

When the program information classification unit 702 informs the screen construction unit 705 that there is no program information that cannot be displayed, the screen construction unit 705 constructs an EPG information screen based on the program information received from the program information update unit 704 and screen constituent information, similarly to the screen construction unit 605 of FIG. 6.

The display unit 706 displays the EPG information screen constructed by the screen construction unit 705. The EPG information screen may be displayed as illustrated in FIG. 5.

Figure 8:
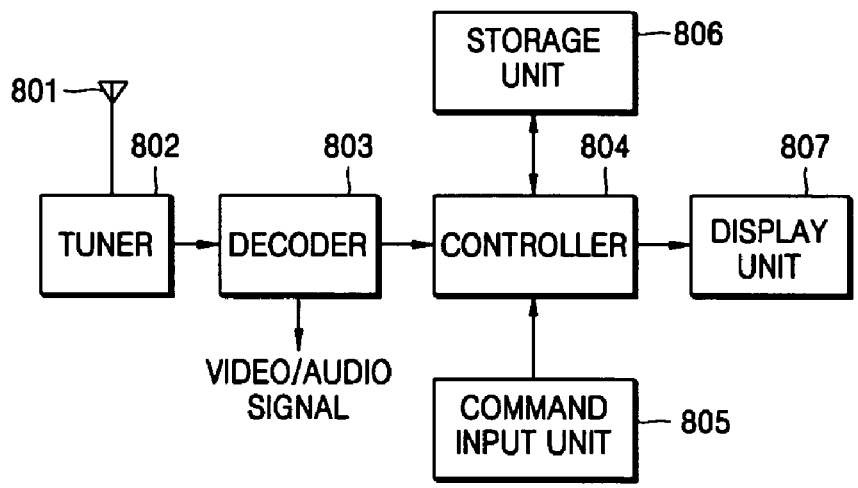
FIG. 8 is a block diagram illustrating a broadcasting receiver according to an exemplary embodiment of the present invention.

FIG. 8 is a block diagram illustrating a broadcasting receiver according to an exemplary embodiment of the present invention. The broadcasting receiver may be a digital broadcasting receiver. Referring to FIG. 8, the broadcasting receiver includes an antenna 801, a tuner 802, a decoder 803, a controller 804, a command input unit 805, a storage unit 806, and a display unit 807.

The tuner 802 receives a broadcast signal via the antenna 801. The decoder 803 decodes the broadcast signal received from the tuner 802 to obtain EPG information and a video/audio signal. The decoder 803 may decode the broadcast signal in a manner in which transmission packets are decoded. The obtained EPG information is transmitted to the controller 804, and the video/audio signal is transmitted to a video/audio decoder (not shown).

The controller 804 adjusts or changes program information, for each broadcast program, which is detected from the EPG information, according to a display region, for each broadcast program, which is to be set in an EPG information screen, based on the EPG information received from the decoder 803 and screen constituent information of the EPG information; and then generates the EPG information screen that reflects the adjusted or changed program information. The program information may be adjusted or changed as described with reference to FIG. 4, 6, or 7. Therefore, the controller 804 classifies the program information, for each broadcast program, which is to be displayed, into two types: program information that can be displayed in corresponding display regions and program information that cannot be displayed in the corresponding display regions, as described with reference to FIG. 4, 6, or 7.

When the screen constituent information is input to the command input unit 805, the command input unit 805 transmits it to the controller 804. The screen constituent information has been described with reference to FIG. 4.

The storage unit 806 stores the EPG information controlled by the controller 804.

The display unit 807 displays the EPG information screen generated by the controller 804.

Figure 9:
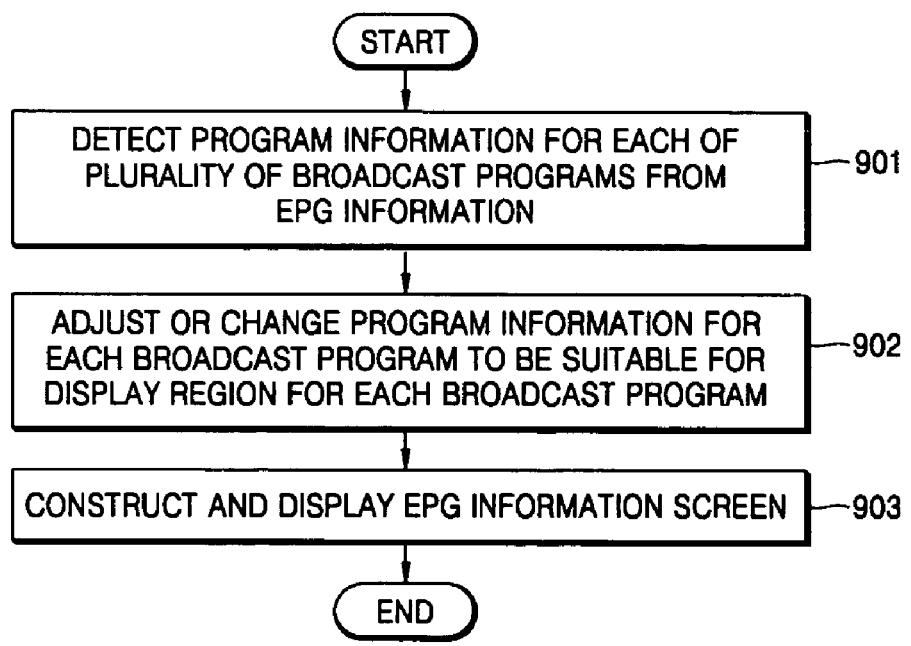
FIG. 9 is a flowchart illustrating a method of displaying EPG information according to an exemplary embodiment of the present invention.

FIG. 9 is a flowchart illustrating a method of displaying EPG information according to an exemplary embodiment of the present invention. First, an apparatus that displays EPG information according to an exemplary embodiment of the present invention detects program information, which is categorized according to broadcast programs, to be displayed from the EPG information (901). The program information is detected as described with respect to the program information detector 601 of FIG. 6. For instance, when the program title of each broadcast program is set as program information to be displayed, the program title of each broadcast program is detected from the EPG information.

Next, the program information for each broadcast program is adjusted or changed to be suitable for a display region, for each broadcast program, which is to be set in an EPG information screen (902). The program information is adjusted or changed, such that the program information of the content of the broadcast programs which a user can recognize is displayed in corresponding display regions. For instance, the program information may be adjusted or changed by deleting a word that is not required for a user to understand the program content from the program information, replacing the program information with a substitute word, such as those indicated with block letters in FIG. 5, which represents the program genre, for example, or replacing the program information with an icon that represents the program content.

The above apparatus constructs and displays the EPG information that includes the adjusted or changed program information (903).

Figure 10:
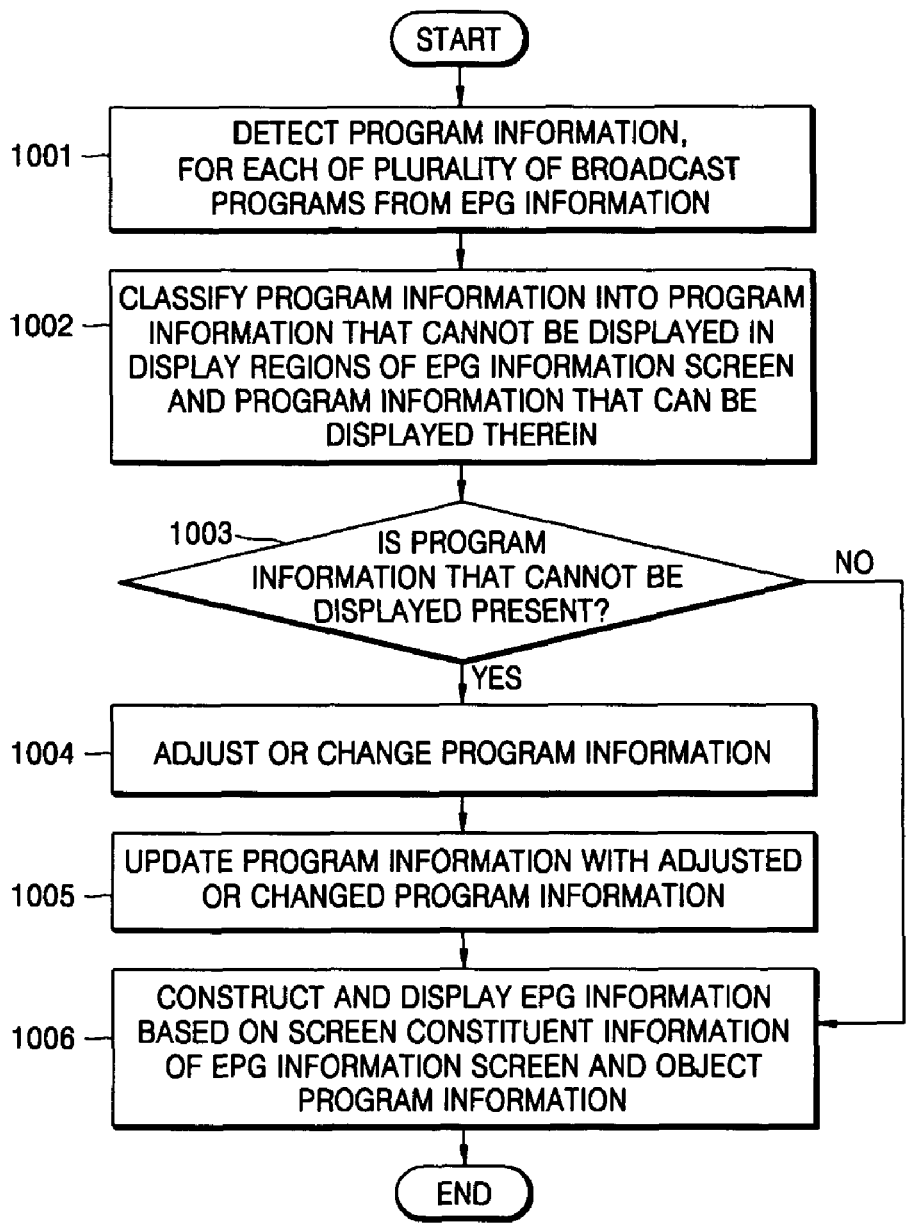
FIG. 10 is a flowchart illustrating a method of displaying EPG information according to another exemplary embodiment of the present invention.

FIG. 10 is a flowchart illustrating a method of displaying EPG information according to another exemplary embodiment of the present invention. First, an apparatus that displays EPG information according to an exemplary embodiment of the present invention detects program information for each broadcast program from the EPG information (1001). The program information is detected similarly to operation 901 of FIG. 9.

Figure 11:
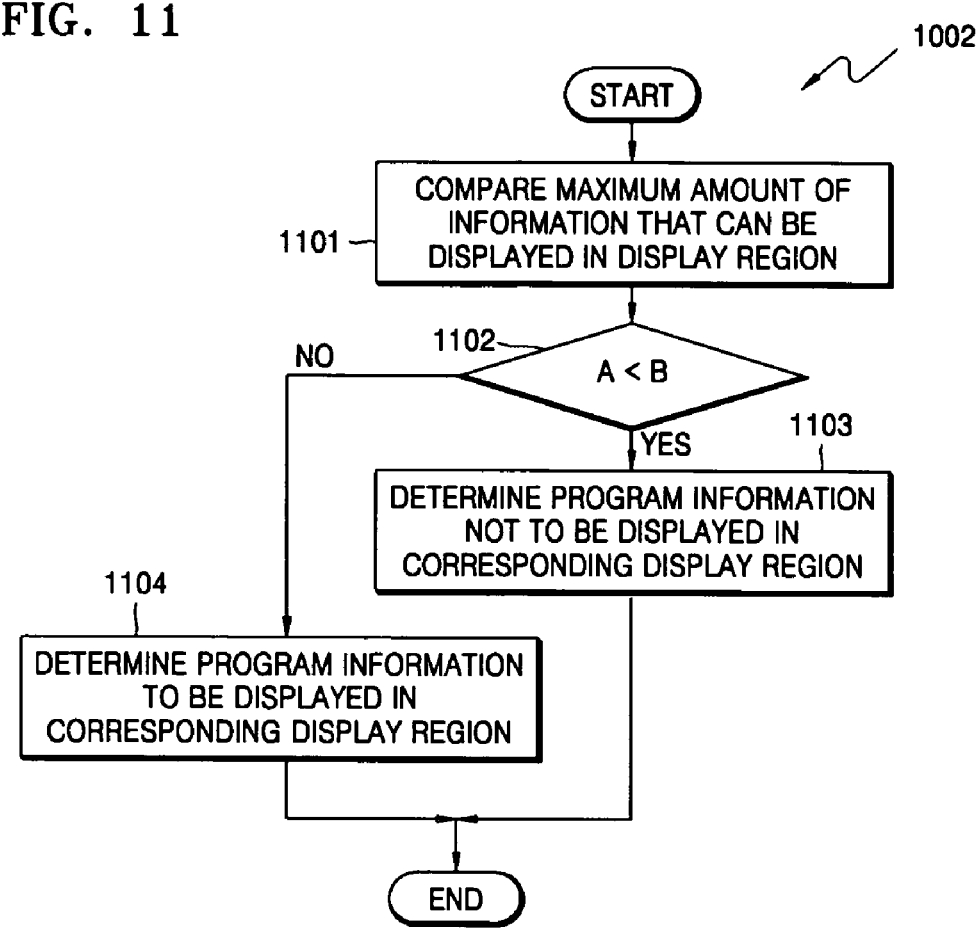
FIG. 11 is a detailed flowchart illustrating operation 1002 of FIG. 10 according to an exemplary embodiment of the present invention.

The detected program information is categorized into program information that cannot be displayed in display regions of an EPG information screen and program information that can be displayed therein (1002). That is, the apparatus can categorize the program information into two types, as illustrated in FIG. 11. FIG. 11 is a detailed flowchart illustrating operation 1002 of the method illustrated in FIG. 10 according to an exemplary embodiment of the present invention.

Referring to FIG. 11, the maximum amount of information (A) that can be displayed in the display regions, is compared with the amount of the program information (B) to be displayed in the display regions (1101). The maximum amount of the information (A) and the amount of the program information (B) may be represented using font length.

If it is determined in operation 1102 that the amount of the program information (B) is greater than the maximum amount of the information (A), the program information is determined not to be displayed in a corresponding display region (1103). If it is determined in operation 1102 that the amount of the program information (B) is less than or equal to the maximum amount of the information (A), the program information is determined to be displayed in the corresponding display region (1104).

Figure 12:
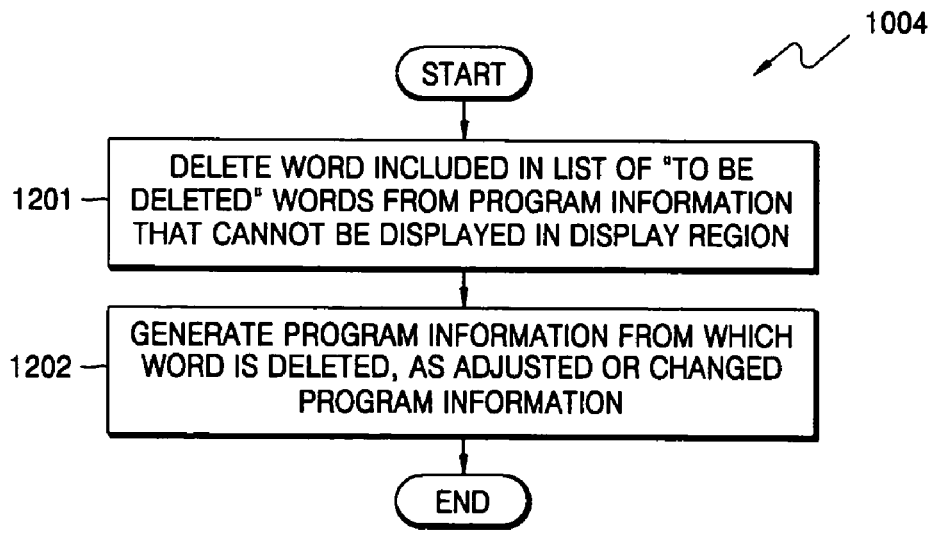
FIG. 12 is a detailed flowchart illustrating operation 1004 of FIG. 10 according to an exemplary embodiment of the present invention.

If it is determined in operation 1003 that there is program information that cannot be displayed in a corresponding display region, the apparatus adjusts or changes the program information (1004). That is, the apparatus may adjust or change the program information as illustrated in FIG. 12. FIG. 12 is a detailed flowchart illustrating operation 1004 of the method illustrated in FIG. 10 according to an exemplary embodiment of the present invention.

Referring to FIG. 12, the apparatus deletes words in a list of predetermined "to be deleted" words from the program information that cannot be displayed in the corresponding display region (1201). The list of the predetermined "to be deleted" words has been described with reference to FIG. 4. Next, the apparatus generates the program information from which the words are deleted, as adjusted or changed program information (1202).

Figure 13:
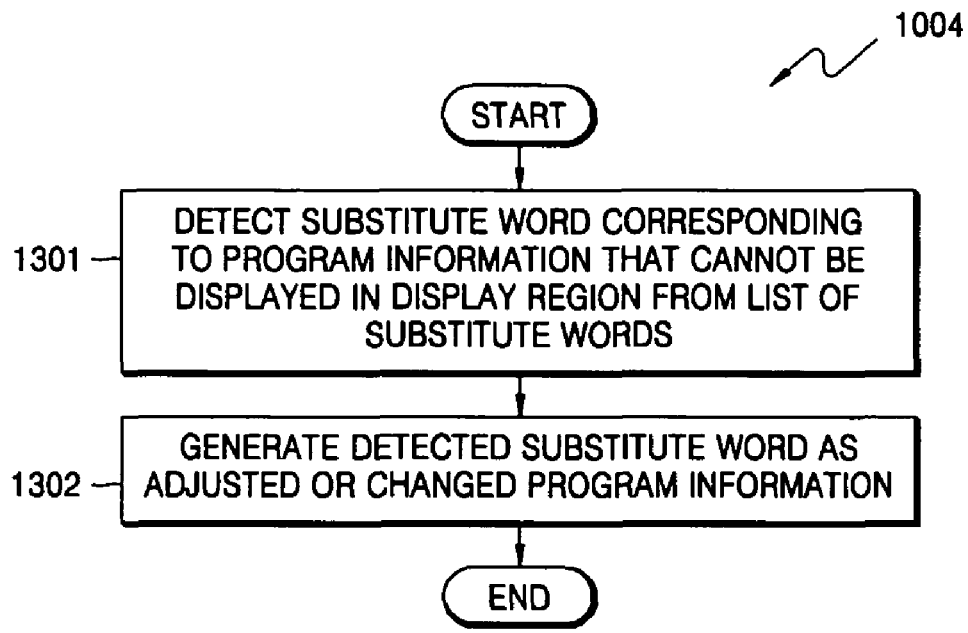
FIG. 13 is a detailed flowchart illustrating operation 1004 of FIG. 10 according to another exemplary embodiment of the present invention.

Alternatively, the apparatus may adjust or change the program information as described with reference to FIG. 13. FIG. 13 is a detailed flowchart illustrating operation 1004 of the method illustrated in FIG. 10 according to another exemplary embodiment of the present invention. Referring to FIG. 13, the apparatus detects a substitute word corresponding to the program information that cannot be displayed in the corresponding display region, from a list of predetermined substitute words (1301). The substitute word has been described with reference to FIG. 4.

Next, the apparatus generates the detected substitute word, as adjusted or changed program information (1302).

Figure 14:
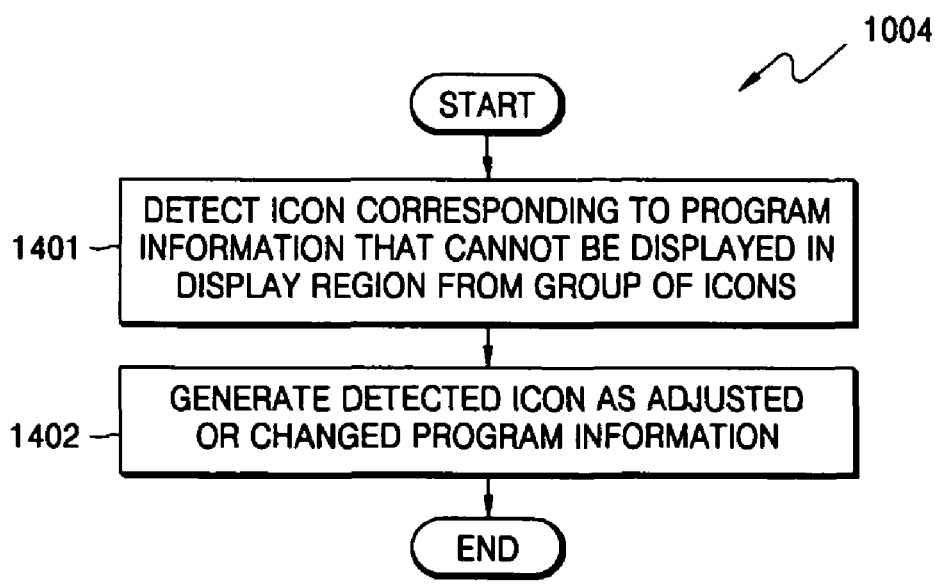
FIG. 14 is a detailed flowchart illustrating operation 1004 of FIG. 10 according to another exemplary embodiment of the present invention.

Alternatively, the apparatus may adjust or change the program information as described with reference to FIG. 14. FIG. 14 is a detailed flowchart illustrating operation 1004 of the method illustrated in FIG. 10 according to another exemplary embodiment of the present invention. Referring to FIG. 14, the apparatus detects an icon corresponding to the program information that cannot be displayed, from a group of predetermined icons (1401). The icon has been described with reference to FIG. 4. The icon may be defined as a mark or an image that can replace the program information. Next, the apparatus may generate the detected icon as adjusted or changed program information (1402).

Next, the apparatus updates the program information to be displayed, based on the adjusted/changed program information (1005). That is, the apparatus updates the program information to be displayed, so that it can reflect both the adjusted/changed program information and the program information that is not adjusted/changed.

Next, the EPG information screen is constructed and displayed based on the program information to be displayed, and screen constituent information regarding the EPG information (1006). The screen constituent information has been described with reference to FIG. 4

Meanwhile, when it is determined in operation 1003 that there is no program information that cannot be displayed in the display regions, the method proceeds to operation 1006, in which the EPG information screen is constructed and displayed based on the program information to be displayed, which is detected from the EPG information, and the screen constituent information of the EPG information.

Figure 15:
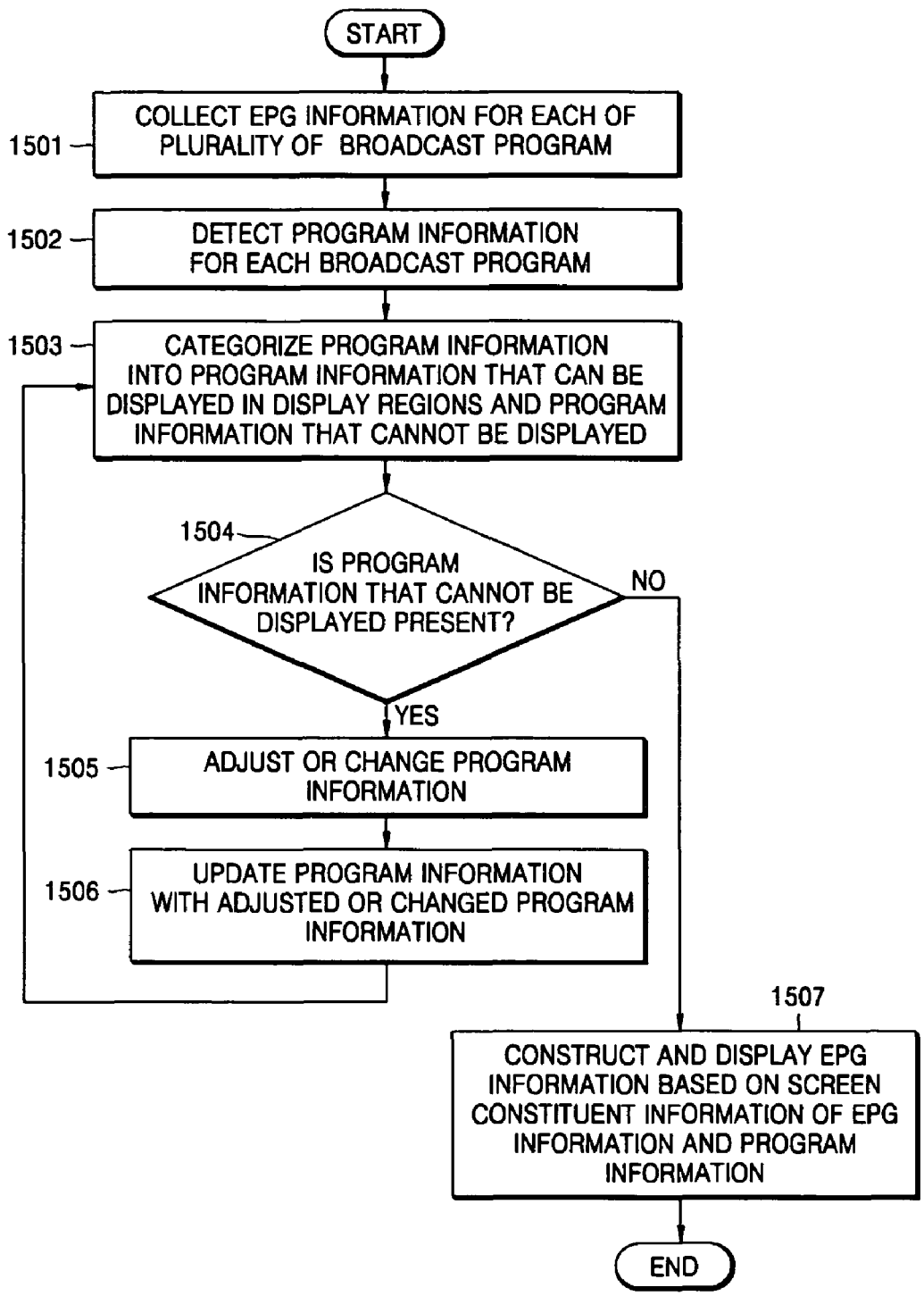
FIG. 15 is a flowchart illustrating a method of displaying EPG information according to another exemplary embodiment of the present invention.

FIG. 15 is a flowchart illustrating a method of displaying EPG information according to an exemplary embodiment of the present invention. First, an apparatus that displays EPG information according to an exemplary embodiment of the present invention collects EPG information for each broadcast program from a broadcast signal (1501). The collection of the EPG information may include decoding the broadcast signal to detect the EPG information from the broadcast signal, and storing the detected EPG information in a storage unit.

Next, program information, for each broadcast program, which is to be displayed is detected, using the collected EPG information and screen constituent information of the EPG information (1502). The program information to be displayed is detected similarly to operation 901 of FIG. 9.

Next, the program information to be displayed is categorized into program information that cannot be displayed in display regions to be set in an EPG information screen, and program information that can be displayed therein (1503). The categorization of the program information is performed similarly to operation 1002 of the method illustrated in FIG. 10.

If it is determined in operation 1504 that there is program information that cannot be displayed in the display regions, the apparatus adjusts or changes the program information (1505). In this case, the program information that cannot be displayed may be adjusted or changed as illustrated in FIG. 16.

Figure 16:
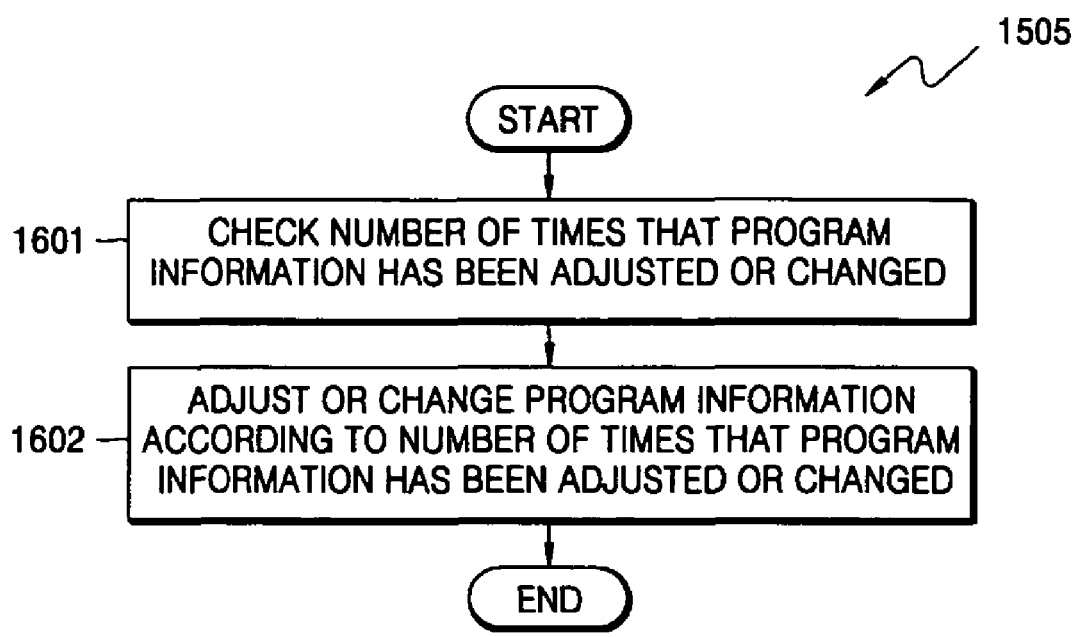
FIG. 16 is a detailed flowchart illustrating operation 1505 of FIG. 15 according to an exemplary embodiment of the present invention.

FIG. 16 is a detailed flowchart illustrating operation 1505 of the method illustrated in FIG. 15 according to an exemplary embodiment of the present invention. Referring to FIG. 16, the apparatus checks a number of times that the program information that cannot be displayed has been adjusted or changed (1601).

Next, the apparatus adjusts or changes the program information that cannot be displayed, according to the number of times that it has been adjusted or changed (1602).

Figure 17:
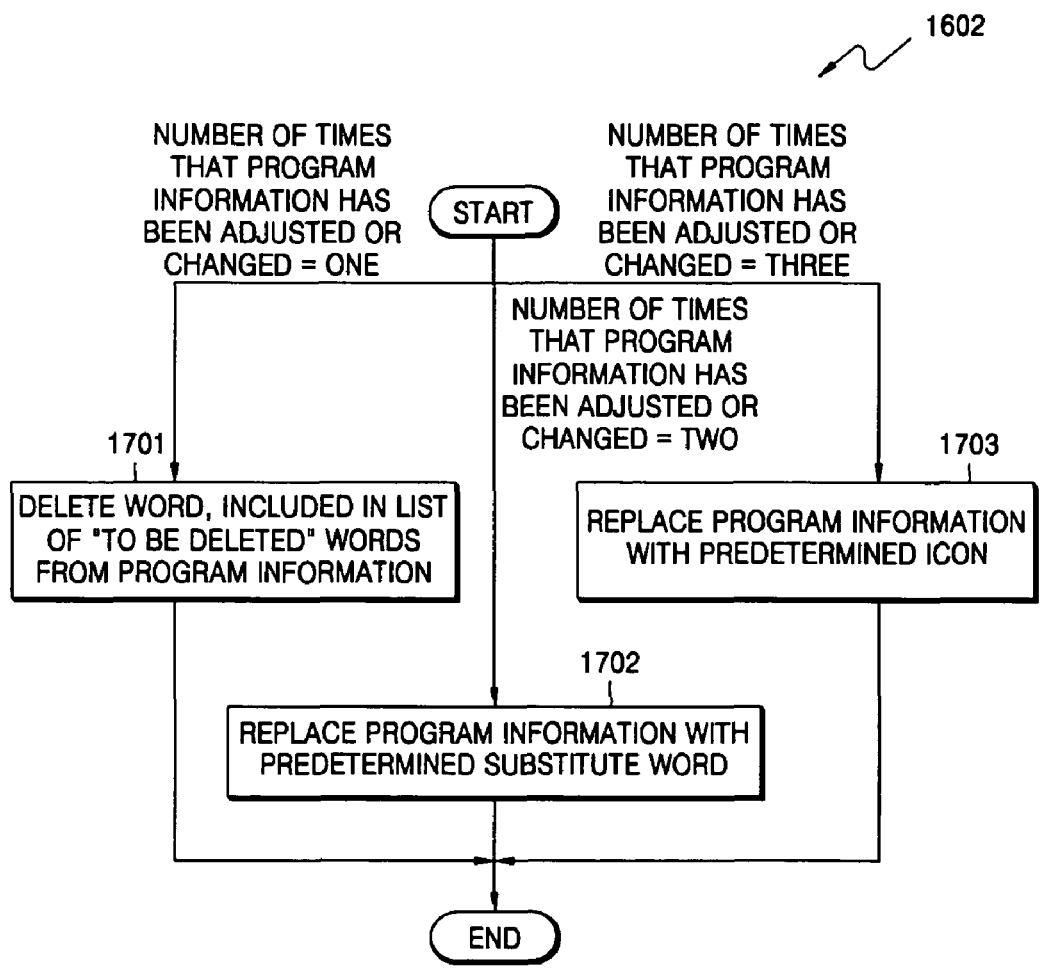
FIG. 17 is a detailed flowchart illustrating operation 1602 of FIG. 16 according to an exemplary embodiment of the present invention.

The apparatus may perform operation 1602 as illustrated in FIG. 17. FIG. 17 is a detailed flowchart illustrating operation 1602 of he method illustrated in FIG. 16 according to an exemplary embodiment of the present invention. Referring to FIG. 17, if the program information has been adjusted or changed only once, the apparatus deletes a word included in a list of predetermined "to be deleted" words from the program information (1701). The list of the "to be deleted" words has been described with reference to FIG. 4.

If the program information has been adjusted or changed twice, the apparatus replaces the program information with a predetermined substitute word (1702). The predetermined substitute word has been described with reference to FIG. 4. The predetermined substitute word may be selected from a list of predetermined substitute icons.

If the program information has been adjusted or changed three times, the apparatus replaces the program information with a predetermined icon (1703). The predetermined icon has been described with reference to FIG. 4. The predetermined icon may be selected from a group of predetermined substitute icons.

After adjusting or changing the program information that cannot be displayed, the apparatus updates the program information to be displayed, based on the adjusted or changed program information (1506). Accordingly, when the program information that cannot be displayed has been adjusted or changed once, the updated program information to be displayed may include the program information from which a word is deleted according to the list of the "to be deleted" words, and the program information that is not adjusted or changed. When the program information that cannot be displayed has been adjusted or changed twice, the updated program information to be displayed may include the program information from which a word is deleted, the program information that is replaced with the substitute word, and the program information that is not adjusted or changed. When the program information that cannot be displayed has been adjusted or changed three times, the updated program information to be displayed may include the program information from which a word is deleted, the program information that is replaced with the substitute word, the program information that is replaced with the icon, and the program information that is not adjusted or changed.

However, the relationship between the manners in which the program information is to be adjusted or changed and the number of times that the program information has been adjusted or changed, can be changed. Also, the number of times that the program information has been adjusted or changed can be changed.

As described above, the program information, which is to be displayed, is adjusted or changed several times until program information that cannot be displayed in display regions is not detected from the program information to be displayed. Thus, the apparatus repeatedly perform operations 1503 through 1506 until it is determined that program information that cannot be displayed is not included in the program information to be displayed.

If the program information that cannot be displayed is not included in the program information to be displayed, the apparatus constructs and displays the EPG information screen, based on the program information to be displayed and the screen constituent information (1507). The EPG information screen may be displayed as illustrated in FIG. 5.

A program that executes a method of displaying EPG information according to the present invention may be embodied as computer readable code in a computer readable recording medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

As described above, according to the present invention, program information is adjusted (or changed) and displayed to be suitable for the sizes of display regions of an EPG information screen. Accordingly, a user can recognize the content of broadcast programs and easily search for the broadcast programs even when display regions for displaying the broadcast programs are small or reduced. Further, it is possible to increase the number of broadcast programs displayed on an EPG information screen more than in the prior art.

Also, the smaller the size of a display region of the EPG information screen, the more simply program information is expressed, and the larger the size of the display region of the EPG information screen, the more detailed the program information is expressed. Therefore, a user can easily search for a broadcast program regardless of whether the size of the display region of the EPG information screen is increased or reduced, and further, adjust the EPG information screen adaptively to the degree that program information is provided.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of displaying electronic program guide information, comprising:
   (a) detecting program information for each of a plurality of broadcast programs, from the electronic program guide information;
   (b) adjusting or changing the program information according to a display region for each broadcast program in an electronic program guide information screen; and
   (c) constructing and displaying the electronic program guide information screen so that the electronic program guide information reflects the adjusted or changed program information,
   wherein, in (b), determining whether to replace the program information with either a predetermined substitute word or a predetermined icon according to a number of times that the program information is adjusted or changed,
wherein, in (b), the program information is not adjusted or changed if the program information is determined to be able to fit into the display region.

2. The method of claim 1, wherein during (b), the program information is adjusted or changed to be displayed in the display region so that a user recognizes the content of the broadcast program.

3. The method of claim 1, wherein, when the program information has been adjusted or changed once, deleting a word included in a list of predetermined words, from program information;
when the program information has been adjusted or changed twice, replacing the program information, with the predetermined substitute word; and
when the program information has been adjusted or changed three times, replacing the program information, with the predetermined icon.

4. A method of displaying electronic program guide information, comprising:
(a) detecting program information, for each of a plurality of broadcast programs from the electronic program guide information, and
(b) categorizing the detected program information into program information which is allowed to be displayed in display regions of an electronic program guide information screen and program information which is not allowed to be displayed in the display regions,
(c) adjusting or changing the program information according to a display region for each broadcast program in an electronic program guide information screen,
where a determination is made whether to replace the program information with either a predetermined substitute word or a predetermined icon according to a number of times that the program information is adjusted or changed,
wherein the detected program information is categorized by comparing a maximum amount of information that can be displayed according to a display region for each broadcast program in the electronic program guide information screen with an amount of program information to be displayed in the display regions,
wherein, in (c), the program information is not adjusted or changed if the program information is determined to be able to fit into the display region.

5. The method of claim 4, further comprising:
(c) adjusting or changing the program information when the program information which is not allowed to be displayed is present;
(d) updating the program information to be displayed, based on the adjusted or changed program information, and
(e) constructing and displaying the electronic program guide information screen, based on the program information to be displayed and screen constituent information of the electronic program guide information.

6. The method of claim 5, wherein (c) comprises:
(c1) deleting a word included in a list of predetermined words to be deleted from the program information determined not to be displayed in the display region; and
(c2) generating the program information from which the word is deleted, as the adjusted or changed program information.

7. The method of claim 5, wherein (c) comprises:
(c1) detecting the predetermined substitute word corresponding to the program information which is determined not to be displayed, from a list of predetermined substitute words, or detecting the predetermined icon corresponding to the program information which is determined not to be displayed, from a group of predetermined icons; and
(c2) generating the detected predetermined substitute word or the predetermined icon as the adjusted or changed program information.

8. The method of claim 4, wherein (b) comprises:
(b1) comparing a maximum amount of information, which is to be displayed in the display region for each broadcast program in the electronic program guide information screen, with the amount of the program information to be displayed in the display region; and
(b2) when the amount of the program information is greater than the maximum amount of the information, the program information to be displayed is determined not to be displayed in the display region.

9. A method of displaying electronic program guide information, comprising:
(a) collecting the electronic program guide information for each of a plurality of broadcast programs from a broadcast signal;
(b) detecting program information, for each broadcast program, which is to be displayed, using the collected electronic program guide information and screen constituent information of the electronic program guide information;
(c) categorizing the program information to be displayed into program information which is not allowed to be displayed according to a display region for each broadcast program in an electronic program guide information screen, and program information which is allowed to be displayed in the display region;
(d) when program information which is not allowed to be displayed in the display region is present, adjusting or changing the program information, wherein a determination is made to replace the program information with either a predetermined substitute word or a predetermined icon according to a number of times that the program information is adjusted or changed;
(e) updating the program information to be displayed, based on the adjusted or changed program information;
(f) repeatedly performing (c) through (e) until program information which is not allowed to be displayed is not included in the program information to be displayed; and
(g) when program information which is not allowed to be displayed is not included in the program information to be displayed, constructing and displaying the electronic program guide information screen, based on the program information to be displayed and the screen constituent information,
wherein the detected program information is categorized by comparing a maximum amount of information that can be displayed according to the display region for each broadcast program in the electronic program guide information screen with an amount of program information to be displayed in the display regions,
wherein, the program information is not adjusted or changed if the program information is determined to be able to fit into the display region.

10. The method of claim 9, wherein (d) comprises:
(d1) checking the number of times that the program information which is not allowed to be displayed has been adjusted or changed; and
(d2) adjusting or changing the program information which is not allowed to be displayed according to the number of times that the program information has been adjusted or changed.

11. The method of claim 10, wherein (d2) comprises:
(d21) when the program information has been adjusted or changed once, deleting a word included in a list of predetermined words to be deleted, from the program information which is not allowed to be displayed;
(d22) when the program information has been adjusted or changed twice, replacing the program information which is not allowed to be displayed, with the predetermined substitute word; and
(d23) when the program information has been adjusted or changed three times, replacing the program information which is not allowed to be displayed, with the predetermined icon.

12. The method of claim 11, wherein (c) comprises:
(c1) comparing a maximum amount of information, which is to be displayed in the display region, with the amount of the program information to be displayed in the display region; and
(c2) when the amount of the program information is greater than the maximum amount of the information which is to be displayed in the display region, the program information to be displayed is determined not to be displayed in the display region.

13. The method of claim 9, wherein (c) comprises:
(c1) comparing the maximum amount of information to be displayed in the display region with the amount of the program information to be displayed in the display region; and
(c2) when the amount of the program information is greater than the maximum amount of the information, the program information to be displayed is determined not to be displayed in the display region.

14. An apparatus for displaying electronic program guide information, comprising:
a guide information detector which detects the electronic program guide information from a received broadcast signal;
a controller which adjusts or changes program information, for each of a plurality of broadcast programs according to a display region for each broadcast program in an electronic program guide information screen, and generates the electronic program guide information screen so that the electronic program guide information screen reflects the adjusted or changed program information, the electronic program guide information screen being determined using the detected electronic program guide information and screen constituent information of the electronic program guide information,
wherein the controller makes a determination to replace the program information with either a predetermined substitute word or a predetermined icon according to a number of times that the program information is adjusted or changed,
wherein the controller does not adjust or change program information if the program information is determined to be able to fit into the display region.

15. The apparatus of claim 14, further comprising a display unit displaying the electronic program guide information screen generated by the controller.

16. The apparatus of claim 14, wherein, when the program information is not allowed to be displayed in the display region, the controller adjusts or changes the program information to be displayed in the display region, so that a user recognizes the content of a broadcast program corresponding to the program information.

17. The apparatus of claim 14, wherein, when the program information has been adjusted or changed once, the controller deletes a word included in a list of predetermined words, from program information;
when the program information has been adjusted or changed twice, the controller replaces the program information, with the predetermined substitute word; and
when the program information has been adjusted or changed three times, the controller replaces the program information, with the predetermined icon.

18. An apparatus for displaying electronic program guide information, comprising:
a program information detector which detects program information to be displayed for each of a plurality of broadcast programs, from the electronic program guide information;
a program information classification unit which categorizes the detected program information into program information which is allowed to be displayed in display regions to be set in an electronic program guide information screen and program information which is not allowed to be displayed in the display regions, based on information regarding the display regions;
a program information adjusting or changing unit which adjusts or changes the program information which is not allowed to be displayed in the display regions;
a program information update unit which updates the program information to be displayed, based on the adjusted or changed program information;
a screen construction unit which constructs the electronic program guide information screen, based on the program information to be displayed and screen constituent information of the program guide information; and
a display unit which displays the electronic program guide information screen constructed by the screen construction unit,
wherein the detected program information is categorized by comparing a maximum amount of information that can be displayed according to a display region for each broadcast program in the electronic program guide information screen with an amount of program information to be displayed in the display regions,
wherein the program information adjusting or changing unit adjusts or changes the program information which is not allowed to be displayed by determining to replace the program information which is not allowed to be displayed with either a predetermined substitute word or a predetermined icon according to a number of times that the program information is adjusted or changed,
wherein the program information adjusting or changing unit does not adjust or change program information if the program information is determined to be able to fit into the display region.

19. The apparatus of claim 18, wherein the program information adjusting or changing unit adjusts or changes the program information which is not allowed to be displayed by deleting a word included in a list of predetermined words to be deleted, from the program information which is not allowed to be displayed.

20. The apparatus of claim 18, wherein, when the program information classification unit informs the program information update unit that program information which is not allowed to be displayed is not present, the program information update unit transmits the program information to be displayed, which is received from the program information classification unit, to the screen construction unit.

21. An apparatus for displaying electronic program guide information, comprising:
- a program information detector which detects program information to be displayed for each of a plurality of broadcast programs from the electronic program guide information;
- a program information classification unit which categorizes the detected program information into program information which is allowed to be displayed in display regions to be set in an electronic program guide information screen and program information which is not allowed to be displayed in the display regions, based on information regarding the display regions;
- a program information adjusting or changing unit which adjusts or changes the program information which is not allowed to be displayed in the display regions;
- a program information update unit which updates the program information to be displayed, based on the adjusted or changed program information, and transmitting the updated program information to the program information classification unit;
- a screen construction unit which constructs the electronic program guide information screen when the program information classification unit informs the program information update unit that program information which is not allowed to be displayed is not present, based on the program information to be displayed and screen constituent information of the program guide information, the program information, which is to be displayed, being received from the program information update unit; and
- a display unit which displays the electronic program guide information screen constructed by the screen construction unit,
- wherein the detected program information is categorized by comparing a maximum amount of information that can be displayed according to a display region for each broadcast program in the electronic program guide information screen with an amount of program information to be displayed in the display regions,
- wherein the program information adjusting or changing unit adjusts or changes the program information which is not allowed to be displayed in the display regions by determining to replace the program information which is not allowed to be displayed with either a predetermined substitute word or a predetermined icon according to a number of times that the program information is adjusted or changed,
- wherein the program information adjusting or changing unit does not adjust or change program information if the program information is determined to be able to fit into the display region.

22. The apparatus of claim 21, wherein the program information adjusting or changing unit adjusts or changes the program information which is not allowed to be displayed, according to a number of times that the program information which is not allowed to be displayed has been adjusted or changed.

23. A broadcasting receiver for displaying electronic program guide information, comprising:
- a controller which adjusts or changes program information for each of a plurality of broadcast programs according to a display region for each broadcast program in an electronic program guide information screen, using the electronic program guide information for each broadcast program and screen constituent information of the electronic program guide information; and generates the electronic program guide information screen so that the electronic program guide information reflects the adjusted or changed program information, wherein the program information is detected from the electronic program guide information,
- wherein the controller determines to replace the program information with either a predetermined substitute word or a predetermined icon according to a number of times that the program information is adjusted or changed,
- wherein the controller does not adjust or change program information if the program information is determined to be able to fit into the display region.

24. The broadcasting receiver of claim 23, further comprising:
- a decoder which decodes a broadcast signal received from a tuner to obtain the electronic program guide information for each of the plurality of broadcast programs, and
- a command input unit via which screen construction information required to construct the electronic program guide information screen is input.

25. The broadcasting receiver of claim 23, further comprising:
- a storage unit which stores the electronic program guide information for each broadcast program under control of the controller; and
- a display unit which displays the electronic program guide information screen generated by the controller.

26. The broadcasting receiver of claim 23, wherein, when the program information has been adjusted or changed once, the controller deletes a word included in a list of predetermined words, from program information;
- when the program information has been adjusted or changed twice, the controller replaces the program information, with the predetermined substitute word; and
- when the program information has been adjusted or changed three times, the controller replaces the program information, with the predetermined icon.

* * * * *